(12) United States Patent
Matsubara et al.

(10) Patent No.: US 8,037,899 B2
(45) Date of Patent: Oct. 18, 2011

(54) BACKFLOW PREVENTER

(75) Inventors: Masaharu Matsubara, Nagano (JP); Yuichi Takeda, Matsumoto (JP)

(73) Assignees: Shinshu University, Nagano (JP); Nippo Valve Company Ltd., Nagano (JP)

( * ) Notice: Subject to any disclaimer, the term of this patent is extended or adjusted under 35 U.S.C. 154(b) by 281 days.

(21) Appl. No.: 12/387,250

(22) Filed: Apr. 30, 2009

(65) Prior Publication Data

US 2010/0032027 A1    Feb. 11, 2010

(30) Foreign Application Priority Data

May 8, 2008   (JP) ................................. 2008-122081

(51) Int. Cl.
   *F16K 15/00*   (2006.01)
(52) U.S. Cl. ..................... 137/614.2; 137/218; 137/512; 137/613; 137/543.23
(58) Field of Classification Search .................. 137/107, 137/218, 512, 614.2, 543.23, 613
   See application file for complete search history.

(56) References Cited

U.S. PATENT DOCUMENTS

| | | | |
|---|---|---|---|
| 2,912,001 A | 11/1959 | Green | |
| 3,134,394 A | 5/1964 | Ohta | |
| 3,993,093 A | 11/1976 | Mokveld | |
| 4,244,392 A | 1/1981 | Griswold et al. | |
| 4,244,395 A | 1/1981 | Griswold et al. | |
| 4,276,897 A | 7/1981 | Griswold | |
| 4,333,495 A | 6/1982 | Griswold et al. | |
| 4,364,408 A | 12/1982 | Griswold et al. | |
| 4,452,272 A | 6/1984 | Griswold | |
| 4,478,236 A * | 10/1984 | Neuzeret et al. | 137/107 |
| 4,638,832 A | 1/1987 | Mokveld | |
| 4,747,426 A | 5/1988 | Weevers | |
| 4,878,515 A * | 11/1989 | Stevens | 137/218 |

(Continued)

FOREIGN PATENT DOCUMENTS

CA    1066164    11/1979

(Continued)

*Primary Examiner* — Kevin Lee
(74) *Attorney, Agent, or Firm* — Daniel P. Burke & Associates, PLLC

(57) ABSTRACT

A first check valve has a narrow flow path portion (68) formed between an arcuate portion (46) of the outer periphery (45) of a support member and a second enlarged-diameter portion (11) of a casing. The narrow flow path portion (first portion of an intermediate flow path) is in fluidic communication with a back-pressure chamber (50) defined in the support member at the rear of the top of a valving element through a communicating passage (67) including a gap (66) between the outer periphery of the valving element and the inner periphery of a large-diameter portion (38) and grooves (27) on the rear surface of the top of the valving element. Thus, a low static pressure of fluid flowing through the narrow flow path portion is introduced into the back-pressure chamber to move the valving element by a large differential pressure during the supply of fluid, thereby allowing the valve opening to become larger than in the conventional apparatus and enabling a reduction of pressure losses. An intermediate chamber has a pressure chamber (130) defined therein by using a rigid partition. A high-pressure chamber (131) of the pressure chamber is in communication with the upstream side of the first check valve, and a low-pressure chamber (132) thereof is in communication with the narrow flow path portion. Thus, a valving element (136) is acted upon by a force larger than the differential pressure between the upstream side and an internal flow path (106) of the intermediate chamber, thereby allowing a relief valve (135) to be surely kept closed.

19 Claims, 7 Drawing Sheets

U.S. PATENT DOCUMENTS

| | | | | |
|---|---|---|---|---|
| 4,895,180 | A | * | 1/1990 | Vollmer ................ 137/218 |
| 5,921,276 | A | | 7/1999 | Lam |
| 6,769,450 | B2 | * | 8/2004 | Fretwell ............... 137/107 |
| 7,293,576 | B2 | * | 11/2007 | Royse ................. 137/512 |

FOREIGN PATENT DOCUMENTS

| | | |
|---|---|---|
| DE | 2821255 | 11/1979 |
| DE | 202004001540 | 5/2004 |
| GB | 815550 | 6/1959 |
| GB | 2021238 | 11/1979 |
| GB | 2188707 | 10/1987 |
| JP | S50-83819 | 7/1975 |
| JP | SHO 54-150723 | 11/1979 |
| JP | S55-27576 | 2/1980 |
| JP | SHO-63-1871 | 1/1988 |
| JP | HEI-10-288265 | 10/1998 |
| JP | HEI 11-153300 | 6/1999 |
| WO | 89/10509 | 11/1989 |

* cited by examiner

BACKFLOW PREVENTER

BACKGROUND OF THE INVENTION

1. Technical Field

The present invention relates to backflow preventers and, more particularly, to a backflow preventer in which check valves are provided at the upstream and downstream sides, respectively, and a relief valve is provided in an intermediate chamber formed between the two check valves.

2. Background Art

As a conventional backflow preventer for use in the piping of a water supply system or the like, Japanese Patent Application Publication No. Hei 11-153300, for example, discloses a backflow preventer of pressure-reducing type in which check valves are provided at the upstream and downstream sides, respectively, and a relief valve is provided in an intermediate chamber formed between the two check valves. In this type of backflow preventer, the valving element of the relief valve is constantly acted upon by a spring in the direction for opening the valve. A valve stem extending from the body of the valving element is secured to a diaphragm. The diaphragm is acted upon at both sides thereof by the primary pressure and the intermediate-chamber pressure, respectively. The differential pressure between the two water pressures acts in the direction for closing the relief valve. Thus, the relief valve is normally closed by the action of the differential pressure. The relief valve is opened when the difference between the primary pressure and the intermediate-chamber pressure has become smaller than a predetermined value, for example, when sealing of the upstream check valve cannot be properly performed owing to an abnormality in the check valve, or when there is reduction in the upstream pressure due to the burst of the piping or the like. By opening the relief valve, water is discharged from the intermediate chamber to prevent backflow.

Check valves usually used in the above-described backflow preventer are of the type that a valving element that is movable in the flow direction is urged toward a valve seat by a spring or other urging member. When the backflow preventer is installed in the piping of a water supply system, the relief valve is open in a state where water has not yet been supplied therethrough. Therefore, when the supply of water is started for the first time, the supplied water will be undesirably discharged from the intermediate chamber unless the relief valve is closed before the first check valve opens. Accordingly, a fairly strong spring is used as the spring of the first check valve to prevent the first check valve from immediately opening when the supply of water is started for the first time. In the meantime, the water pressure at the upstream side of the diaphragm is introduced to act on the high-pressure side of the diaphragm, thereby allowing the relief valve to be surely closed before the first check valve opens. Further, the spring of the relief valve is set so that the relief valve is opened when the differential pressure reaches a set value, as has been stated above. Regarding the first check valve, the spring used therefor needs to be set so as to generate a differential pressure that can surely keep the relief valve closed against the spring of the relief valve. During the supply of water, it is also necessary to keep the relief valve closed by a differential pressure between the upstream and downstream sides. Therefore, the first check valve needs to generate a correspondingly large differential pressure. Due to these conditions to be met, considerably large pressure losses are produced in the conventional pressure-reducing backflow preventer.

A booster pump is used to supply water to the upper floors of a building. The pump has to do extra work correspondingly to pressure losses produced by pipes, valves, backflow preventer, etc. connected to the upstream and downstream sides of the pump. A large pressure loss is produced particularly in the first check valve of the backflow preventer, as has been stated above, which places a heavy load on the pump. Accordingly, if pressure losses due to backflow prevention are reduced, the load on the pump can be reduced to a considerable extent, and the power consumption can be reduced.

Standards are provided for backflow preventers. Among them is the pressure difference between the upstream and downstream (i.e. intermediate chamber) sides of the first check valve which will cause the relief valve to open. In this regard, if the pressure loss in the first check valve is reduced, the difference between the primary pressure and the intermediate-chamber pressure during the water supply may become smaller than the specified pressure difference, resulting in the relief valve undesirably opening during the water supply.

SUMMARY OF THE INVENTION

The present invention provides a backflow preventer of pressure-reducing type that is capable of reducing pressure losses in at least a section thereof, such as in the first check valve and the intermediate chamber, in comparison to conventional backflow preventers, thereby reducing the overall pressure losses in the backflow preventer, and is capable of preventing the relief valve from opening during the water supply despite the fact that the pressure reduction in the intermediate chamber is smaller than in a conventional backflow preventer.

The present invention provides a backflow preventer of pressure-reducing type including a first check valve, a second check valve, an intermediate chamber provided between the first check valve and the second check valve, and a relief valve provided in the intermediate chamber. The first check valve comprises a casing, a valving element, an urging member, a back-pressure chamber, a narrow flow path portion, and a communicating passage. The casing has a flow path formed therein and a valve seat formed at an intermediate portion of the flow path. The valving element is disposed in the flow path. The valving element is movable in the flow path to selectively seat on and unseat from the valve seat at one end thereof. The urging member urges the valving element toward the valve seat. The back-pressure chamber movably receives, at one end thereof, a portion of the valving element. The back-pressure chamber is also in fluidic communication with the low pressure chamber of the relief valve. The narrow flow path portion has a small flow path area and is formed downstream of a position at which the valving element abuts against the valve seat. One end of the narrow flow path portion is brought into and out of communication with the upstream side of the flow path in response to the valving element unseating from and seating on the valve seat. The other end of the narrow flow path portion is constantly in communication with the downstream side of the flow path. A communicating conduit provides fluidic communication between the narrow flow path portion and the back-pressure chamber. The relief valve includes a discharge port, a valving element, an urging member, and a differential pressure applying mechanism. The discharge port is formed in a casing of the intermediate chamber and has a valve seat. The valving element is movable to selectively seat on and unseat from the valve seat. The urging member urges the valving element away from the valve seat. The differential pressure applying mechanism applies a differential pressure, determined by a pressure differential between the fluid pressure at the upstream side of the first check valve and the fluid pressure in the narrow flow path portion, to the valving element in a direction against the urging member.

The differential pressure applying mechanism may have a pressure chamber having its interior divided into a high-pressure chamber and a low-pressure chamber by a pressure-receiving movable member, and a coupling member that causes the pressure-receiving movable member and the valving element to move in interlocking relation to each other.

The pressure chamber may be a part of the intermediate chamber that is partially defined by a rigid partition.

The pressure-reducing backflow preventer may further include a high-pressure side communicating conduit that communicates the high-pressure chamber with the upstream side of the first check valve, and a low-pressure side communicating conduit that communicates the low-pressure chamber with the narrow flow path portion.

The low-pressure chamber may also communicate with the narrow flow path portion through the back-pressure chamber.

The first check valve may further include a diffuser flow path portion that is contiguous with the downstream side end of the narrow flow path portion. The diffuser flow path portion gradually increases in flow path area toward the downstream side thereof.

The first check valve may further include a uniform flow path portion that is contiguous with the downstream side end of the diffuser flow path portion. The uniform flow path portion has a uniform flow path area.

The second check valve may include a casing, a valving element, an urging member, a back-pressure chamber, a narrow flow path portion, and a communicating passage. The casing has a flow path formed therein and a valve seat formed at an intermediate portion of the flow path. The valving element is disposed in the flow path. The valving element is movable in a flow direction in the flow path to selectively seat on and unseat from the valve seat at one end thereof. The urging member urges the valving element toward the valve seat. The back-pressure chamber movably receives, at one end thereof, a portion of the valving element. The other end of the back-pressure chamber is preferably closed. The narrow flow path portion has a small flow path area and is downstream of a position at which the valving element abuts against the valve seat. One end of the narrow-flow path portion is brought into and out of communication with the upstream side of the flow path in response to the valving element unseating from and seating on the valve seat. The other end of the narrow flow path portion is constantly in communication with the downstream side of the flow path.

ADVANTAGEOUS EFFECTS OF INVENTION

Thus, in the pressure-reducing backflow preventer of the present invention, the first check valve is provided with a back-pressure chamber that movably receives one portion (a downstream portion) of the valving element. The back-pressure chamber is in fluidic communication with a narrow flow path portion in which the static pressure of fluid becomes very low during the fluid supply. Movement of the valving element is facilitated by using the differential pressure between the upstream fluid pressure and the fluid pressure in the back-pressure chamber. Accordingly, the size of the valve opening can be larger than a conventional backflow preventer for the same conditions regarding the flow rate and so forth. Consequently, pressure losses in the first check valve, i.e. the overall pressure losses in the backflow preventer, can be greatly reduced in comparison to a conventional apparatus. Thus, the fluid supply performance can be improved to a considerable extent. When a booster pump is used, for example, the load on the pump can be reduced. Therefore, energy consumption can be greatly reduced.

In addition, the present invention provides an arrangement for a relief valve that is preferably provided in the intermediate chamber. According to the present invention, a differential pressure between the upstream pressure and the pressure in the narrow flow path portion is used as a force for keeping the relief valve closed. Therefore, even if pressure losses caused by the first check valve during the fluid supply decrease and, consequently, the differential pressure between the upstream and downstream sides decreases, the relief valve can be surely kept closed independently of the differential pressure between the upstream and downstream sides. If the second check valve has the same arrangement as that of the first check valve, the overall pressure losses in the backflow preventer can be further reduced.

DETAILED DESCRIPTION OF THE PREFERRED EMBODIMENTS

Figure 1:
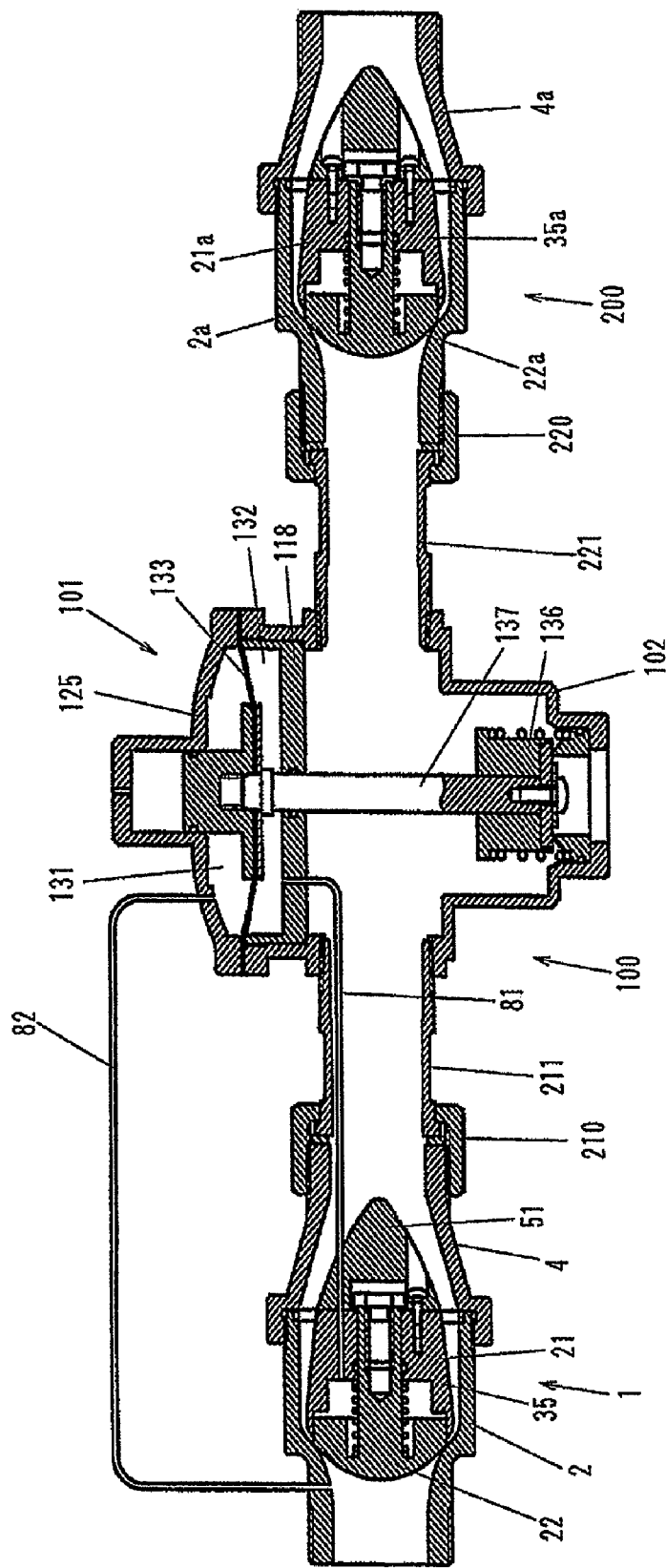
FIG. 1 is a front view showing the general structure of a pressure-reducing backflow preventer according to an embodiment of the present invention.

Embodiments of the present invention will be described below with reference to the accompanying drawings. FIG. 1 is a front view showing the general structure of a pressure-reducing backflow preventer 1A (hereinafter referred to simply as "backflow preventer") according to an embodiment of the present invention. The backflow preventer 1A comprises substantially three sections, i.e. a first check valve 1, an intermediate chamber 100, and a second check valve 200, which are located in the mentioned order from the upstream side when the backflow preventer 1A is actually used. In this embodiment, the first check valve 1, the intermediate chamber 100, and the second check valve 200 are constructed individually by using respective casings that are distinct from each other, and connected together by using joints 210 and 220 and connecting pipes 211 and 221. However, all the components of the backflow preventer 1A may be assembled into an integrated structure by using a single casing.

Figure 2:
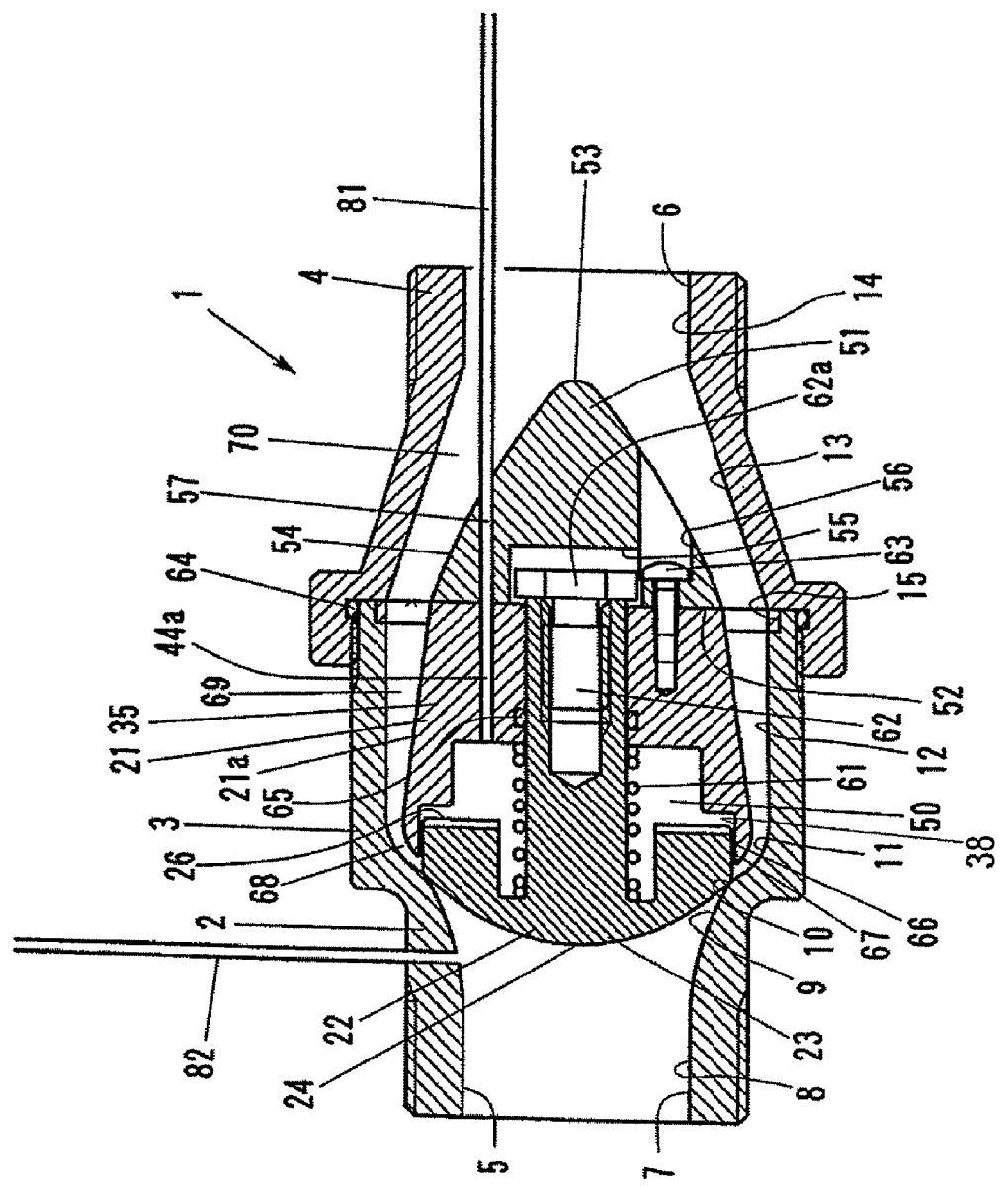
FIG. 2 is a longitudinal sectional view showing a first check valve used in the backflow preventer of FIG. 1 that is in a water stop position.
Figure 3:
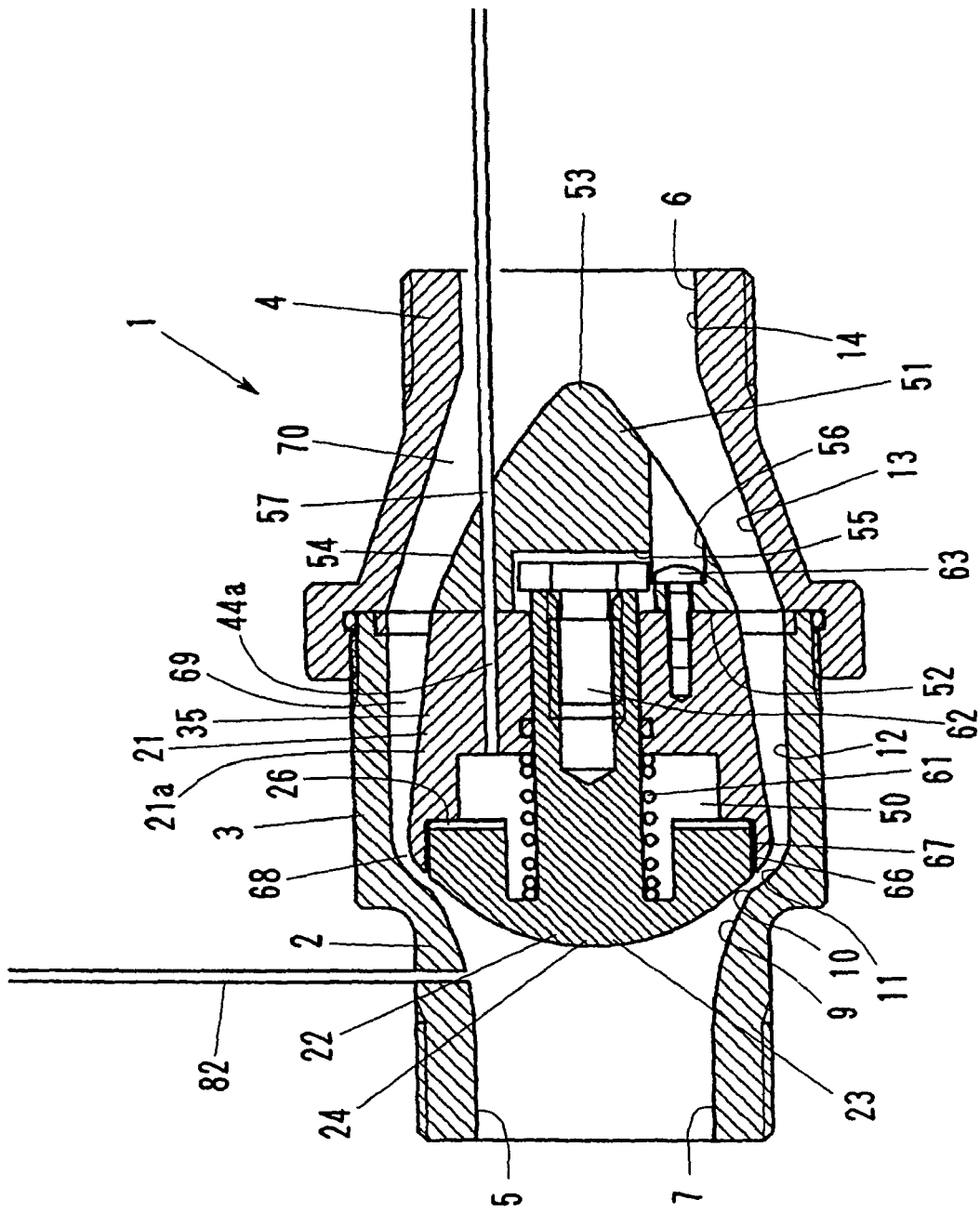
FIG. 3 is a longitudinal sectional view showing the first check valve used in the backflow preventer of FIG. 1 that is in a water supply position.
Figure 4A:
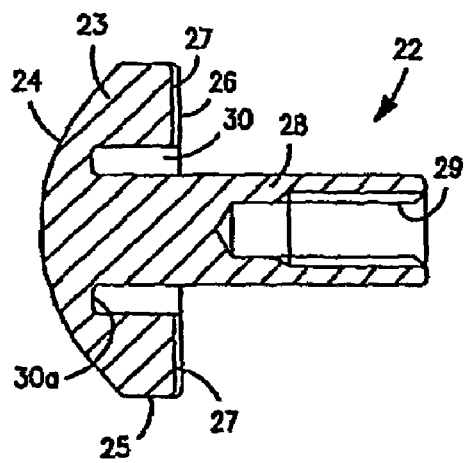
FIGS. 4A and 4B are a longitudinal sectional view and a right side view, respectively, of a valving element used in the first check valve.
Figure 4B:
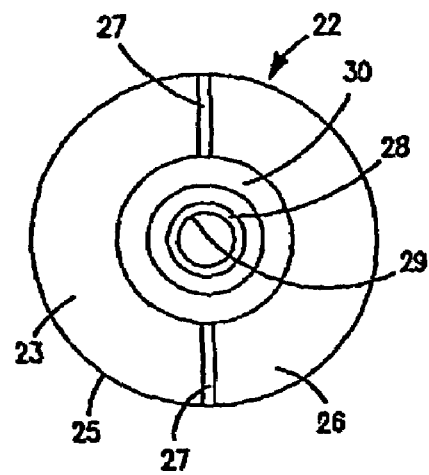
Figure 5A:
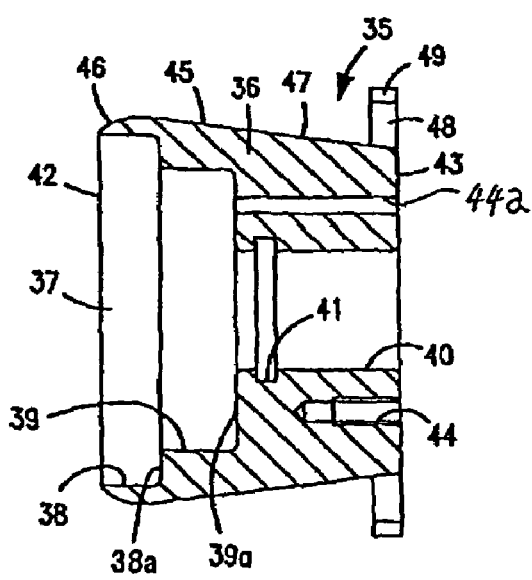
FIGS. 5A and 5B are a longitudinal sectional view and a right side view, respectively, of a valving element support member used in the first check valve.
Figure 5B:
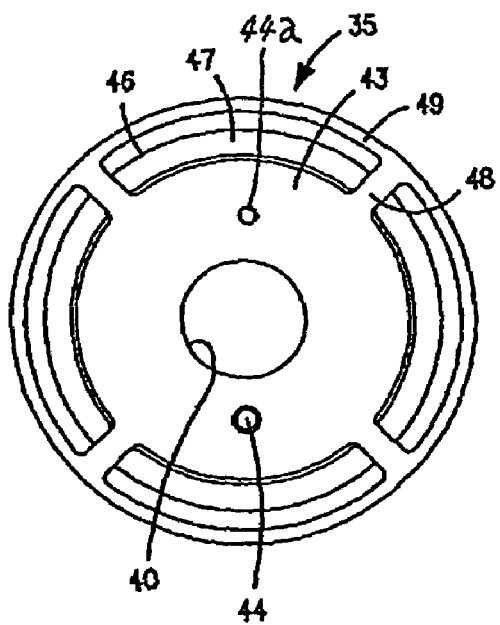

The first check valve 1 will be explained below with reference to FIGS. 2 to 5B. FIGS. 2 and 3 are longitudinal sectional views showing the first check valve 1 in a closed position and in an open position, respectively. FIGS. 4A and 4B are a longitudinal sectional view and a right-hand side view, respectively, of a valving element 22 used in the first check valve 1. FIGS. 5A and 5B are a longitudinal sectional view and a right-hand side view, respectively, of a valving element support member 35 used in the first check valve 1.

In FIGS. 2 and 3, a casing 2 comprises a casing body 3 and a retaining member 4 connected to the casing body 3 by thread engagement in this embodiment. The retaining member 4 is a member for installing a valving element assembly 21 (described later) inside the casing 2. The casing 2 is hollow throughout the body 3 and the retaining member 4 to form a through-hole 7. The through-hole 7 has openings at opposite ends thereof that are used as an inlet port 5 and an outlet port 6 when water flows in the forward direction (from left to right in FIG. 2). The terms "upstream" and "downstream" are used herein with reference to this "forward" flow direction.

The through-hole 7 in the casing 2 has the following configuration. The through-hole 7 has a first uniform-diameter portion 8, a first enlarged-diameter portion 9, a valve seat portion 10, a second enlarged-diameter portion 11, a second uniform-diameter portion 12, a reduced-diameter portion 13, and a third uniform-diameter portion 14. The first uniform-diameter portion 8 extends from the inlet port 5 over a range of a predetermined length in the axial direction of the casing 2 and has a uniform inner diameter throughout its length. The first enlarged-diameter portion 9 extends contiguously from the first uniform-diameter portion 8 and gradually increases in diameter along a circular arc with a relatively large diameter that is convex inwardly of the through-hole 7. The valve seat portion 10 is formed along a small-diameter circular arc, which is substantially smoothly contiguous with the first enlarged-diameter portion 9. The second enlarged-diameter portion 11 gradually increases in diameter along a circular arc that is convex in the direction opposite to that of the first enlarged-diameter portion 9. The circular arc of second enlarged-diameter portion 11, has a diameter larger than the arc of valve seat portion 10 and smaller than the arc of first enlarged-diameter portion 9. The second uniform-diameter portion 12 extends contiguously from the second enlarged-diameter portion 11. The reduced-diameter portion 13 extends contiguously from the second uniform-diameter portion 12 and gradually decreases in diameter along a taper with a predetermined angle. The third uniform-diameter portion 14 extends contiguously from the reduced-diameter portion 13 to the outlet port 6 and has the same diameter as the first uniform-diameter portion 8.

The following is an explanation of the valving element assembly 21 installed in the casing 2. The valving element assembly 21 mainly comprises a valving element 22, a valving element support member 35 that receives the valving element 22 at one end thereof and guides movement of the valving element 22, a spacer 51 secured to the valving element support member 35 at an end thereof opposite to the valving element 22, and a spring (compression spring) 61 serving as an urging member that urges the valving element 22 toward valve seat portion 10. The valving element support member 35 and the spacer 51 are integrated into a valving element support 21a.

The valving element 22 will be explained below with reference to FIGS. 4A and 4B, which are a sectional view and a right side view, respectively, in conjunction with FIGS. 2 and 3. As shown in these figures, the valving element 22 has a substantially mushroom-shaped configuration. That is, the valving element 22 has a top 23 having a front surface 24 with an arcuate sectional configuration and an outer peripheral portion 25 with a predetermined height. The valving element 22 further has a stem 28 projecting rearward from the center of a rear surface 26 of the top 23 substantially at right angles to the rear surface 26. The stem 28 has an axially extending internal thread 29 formed at the rear side thereof. The rear surface 26 of the top 23 has a circumferential groove 30 formed at the root of the stem 28 and further has grooves 27 extending radially from the outer peripheral portion 25 to the circumferential groove 30. This illustrated embodiment comprises two grooves 27 which are circumferentially spaced from each other by 180 degrees.

Next, the valving element support member (hereinafter referred to simply as "support member") 35 will be explained with reference to FIGS. 5A and 5B, which are a sectional view and a right side view, respectively, in conjunction with FIGS. 2 and 3. The support member 35 has a body portion 36 having a substantially circular cylindrical configuration. A through-hole 37 extending axially through the body portion 36 comprises, in order from the left side in FIG. 5A, a large-diameter portion 38 having the largest diameter, an intermediate-diameter portion 39 formed next to the large-diameter portion 38, and a small-diameter portion 40 of the smallest diameter that is formed next to the intermediate-diameter portion 39. The small-diameter portion 40 has a circumferential groove 41 formed at a position close to the intermediate-diameter portion 39 to receive an O-ring for sealing (described later). Meanwhile, a plurality (two in the illustrated example) of internally threaded holes 44 are formed in the downstream end surface 43 of the body portion 36 around the small-diameter portion 40. Reference numeral 44a denotes a through-hole extending from the downstream end 39a of the intermediate-diameter portion 39 to the downstream end 43. The function of through-hole 44a will be explained later.

The outer periphery 45 of the body portion 36 of the support member 35 has the following configuration. The outer periphery 45 comprises an arcuate portion 46 and a tapered portion 47. The arcuate portion 46 extends over a relatively short range at the upstream end surface 42 of the body portion 36 along an outwardly convex circular arc. More specifically, the arcuate portion 46 gradually increases in diameter and thereafter slightly decreases in diameter. The tapered portion 47 extends in the direction of a line tangent to the terminating end of the arcuate portion 46. The tapered portion 47 gradually decreases in diameter toward the downstream end surface 43 of the body portion 36. The downstream end surface 43 of the body portion 36 is provided with four ribs 48 extending outward from the outer periphery 45. The ribs 48 have the same length and are equally spaced from each other in the circumferential direction. The respective outer ends of the ribs 48 are connected to an annular portion 49.

Referring to FIG. 2 again, the spacer 51 is substantially conical in shape and has a flat upstream surface 52 that corresponds in shape and size to the downstream end 43 of the support member 35 and that is placed on the surface of downstream end 43 when the spacer 51 and the support member 35 are assembled together. The spacer 51 further has a downstream end 53 formed with an arcuate sectional configuration and an outer peripheral portion 54 formed along an outwardly convex circular arc in section that has a large radius of curvature so that the outer peripheral portion 54 gradually decreases in diameter from the upstream surface 52 toward the downstream end 53. The upstream surface 52 has a recess 55 formed at a position corresponding to the through-hole 37 of the support member 35. The recess 55 has a diameter slightly larger than the diameter of the small-diameter portion 40 of the through-hole 37. The outer peripheral portion 54 has bolt-fitting holes 56 formed at respective positions corresponding to the internal threads 44 of the support member 35.

Each bolt-fitting hole 56 is a stepped hole having two different inner diameters, into which a mounting bolt 63 (described later) is fitted. As illustrated in the figures, the recess 55 and the bolt-fitting holes 56 partially overlap with each other configurationally. Thus, the respective insides of the recess 55 and the bolt-fitting holes 56 communicate with each other. Reference numeral 57 denotes a through-hole extending axially through the spacer 51 to communicate with the above-described through-hole 44a formed in the valving element support member 35. The through-hole 57 is connected with a downstream communicating conduit 81. An upstream communicating conduit 82 is connected to through-hole 7 upstream of the valve seat portion 10. The communicating conduits 81 and 82 will be explained later.

Here, let us explain the assembly of the check valve 1. As shown in FIG. 2, the rear surface 26 of the top 23 of the valving element 22 is received in the large-diameter portion 38 of the through-hole 37 of the support member 35. The stem 28 of the valving element 22 is movably received in the small-diameter portion 40 of the through-hole 37 for movement in the axial direction. The compression spring 61 serving as an urging member is disposed around the stem 28 of the valving element 22. The opposite ends of the compression spring 61 respectively abut against the bottom 30a of the circumferential groove 30 of the valving element 22 and the bottom 39a of the intermediate-diameter portion 39 of the support member 35 to urge the valving element 22 leftward in FIG. 2, i.e. toward the valve seat portion 10. Meanwhile, a bolt 62 is engaged with the internal thread 29 of the stem 28 of the valving element 22. Because the top 62a of the bolt 62 positioned in the recess 55 of the spacer 51 is larger in diameter than the small-diameter portion 40 in which the stem 28 is fitted, the valving element 22 cannot come out of the support member 35. It should be noted that the diameter of the outer peripheral portion 25 of the top 23 of the valving element 22 is somewhat smaller than the inner diameter of the large-diameter portion 38 of the support member 35. Therefore, there is a narrow gap 66 between the outer peripheral portion 25 and the large-diameter portion 38.

Next, the spacer 51 is secured to the support member 35 by using mounting bolts 63. The valving element assembly 21 thus constructed is inserted into the body 3 of the casing 2 as illustrated in the figures. The annular portion 49 of the support member 35 is fitted into a groove 15 formed on the inner periphery of the downstream end of the casing body 3, and the retaining member 4 is connected to the casing body 3 by threaded engagement as illustrated in the figures. Reference numeral 64 denotes an O-ring that fluid-tightly seals the joint between the casing body 3 and the retaining member 4. Reference numeral 65 denotes an O-ring that provides a fluid tight seal between the stem 28 of the valving element 22 and the small-diameter portion 40 of the through-hole 37 of the body portion 36.

FIG. 2 shows the check valve 1 in the closed position e.g. a position assumed by the check valve 1 as installed in the piping of a water supply system, when the water flow is stopped by closing a faucet located downstream. The valving element 22 is urged by the spring 61 to seat on the valve seat portion 10 at a valve seat abutting portion 24a of the front surface 24 thereof.

An annular narrow flow path portion 68 having a narrow cross-sectional area, i.e. flow path area, is defined between the arcuate portion 46 of the support member 35 and the second enlarged-diameter portion 11 of the casing 2. The narrow flow path portion 68 forms a first portion of an intermediate flow path between the upstream and downstream flow paths. A diffuser flow path portion 69 is formed between the tapered portion 47 of the support member 35 and the second uniform-diameter portion 12 of the casing 2. The diffuser flow path portion 69 is substantially contiguous with the narrow flow path portion 68. The diffuser flow path portion 69 forms a second portion of the intermediate flow path and gradually increases in flow path area. The flow path area of the diffuser flow path portion 69 at the downstream end thereof (i.e. the position corresponding to the right end of the support member 35) is substantially the same as the flow path area at the outlet port 6. In addition, a uniform flow path portion 70 is defined between the outer peripheral portion 54 of the spacer 51 and the reduced-diameter portion 13 of the casing 2. The uniform flow path portion 70 forms a third portion of the intermediate flow path. The uniform flow path portion 70 extends contiguously with the third uniform-diameter portion 14 while maintaining its flow path area equal to the area at the outlet port 6 and is in communication with the outlet port 6. As stated above, a gap 66 is provided between the outer peripheral portion 25 of the top 23 of the valving element 22 and the inner periphery of the large-diameter portion 38 of the support member 35, and the rear surface 26 of the top 23 is formed with grooves 27. The gap 66 and the grooves 27 constitute in combination a communicating passage 67 that provides communication between a back-pressure chamber 50 formed between the valving element 22 and the support member 35, and the narrow flow path portion 68. The back-pressure chamber 50 is acted upon by the pressure of water at the outlet port 6, i.e. the downstream water pressure. The water pressure in the back-pressure chamber 50 acts on the rear surface 26 of the top 23 of the valving element 22.

FIG. 3 is a sectional view showing the check valve 1 in a water supply state where water is flowing, e.g. as a result of the downstream-side faucet (not shown) being opened. That is, when a downstream-side faucet is opened when the valving element is in the position shown in FIG. 2, the downstream-side water pressure is reduced. Consequently, the water pressure in the back-pressure chamber 50 is also reduced, resulting in a reduction in the pressure acting on the rear surface 26 of the valving element 22. Accordingly, the valving element 22 moves rightward in the figure against the force of the spring 61 to unseat from the valve seat portion 10. Thus, the valve 1 opens.

As a result of the valving element 22 unseating from the valve seat portion 10, water flows downstream through the gap between the valving element 22 and the valve seat portion 10. In this case, due to the difference in sectional area among the various portions of the flow path, the flow velocity at the above-described narrow flow path portion 68 is very high as compared to the flow velocities at the other portions. Therefore, the static pressure of water at the narrow flow path portion 68 is very low in comparison to the other portions. Because this low static pressure acts on the back-pressure chamber 50 through the above-described communicating passage 67, the differential pressure between the water pressures acting on the front and rear surfaces 24 and 26, respectively, of the valving element 22 is very large in comparison to a conventional check valve in which the downstream-side water pressure acts on the rear surface of the valving element. Accordingly, the valve opening created by the opening of the valving element 22 will be larger in comparison to a conventional valve structure for the same conditions regarding the initial pressure at the upstream side, the degree of opening of the downstream-side faucet, the spring used, and so forth, and the pressure losses at the valving element 22 are reduced considerably.

After passing through the narrow flow path portion 68, the flow of water enters the diffuser flow path portion 69. Because the diffuser flow path portion 69 gradually increases in flow path area toward the downstream side, as has been stated above, the static pressure is gradually recovered. Next, the flow of water enters the uniform flow path portion 70. The uniform flow path portion 70 has a uniform flow path area and has a smoothly converging configuration. Therefore, water flows through the uniform flow path portion 70 while substantially maintaining the static pressure recovered in the diffuser flow path portion 69 and reaches the outlet port 6. In this connection, it should be noted, as stated above, the flow path area of the diffuser flow path portion 69 at the downstream end thereof is substantially the same as the flow path area at the outlet port 6. The inlet port 5 and the outlet port 6 in this illustrated embodiment have the same diameter. Therefore, the static pressure of the water which existed at the inlet port 5 is substantially recovered when the water reaches the end of the diffuser flow path portion 69. It is desirable that the uniform flow path portion 70 is provided since it allows water to flow downstream while maintaining the recovered static pressure. However, for example, in the cases where the total length of the casing is limited, the uniform flow path portion 70 may be omitted, taking into consideration pressure losses that may occur.

The flow rate is determined according to the degree of opening of a faucet downstream of the second check valve. Therefore, the flow velocity of water when passing through the narrow flow path portion 68 also varies according to the opening of the downstream-side faucet. The static pressure acting on the back-pressure chamber 50 changes according to the flow rate. In general, the higher the flow rate, the lower the static pressure acting on the back-pressure chamber 50 and the larger the differential pressure acting on the valving element 22. Hence, the valve opening of the valving element 22 increases as the flow rate increases. When the flow rate exceeds a certain level, the rear surface 26 of the valving element 22 abuts against the bottom of the large-diameter portion 38 of the support member 35 to limit further movement of the valving element 22. Under such conditions, the valve opening of the valving element 22 reaches 100 percent. The valve opening, however, may not reach 100 percent when the flow rate is low. In either case, the difference between water pressures acting on the valving element 22 from both sides increases in comparison to the conventional valve structure. Hence, the valve opening of the valving element 22 increases, and the pressure losses decrease. It should be noted that the distal end of the stem 28 of the valving element 22 extends into the recess 55 of the spacer 51 and is therefore acted upon by the water pressure at the downstream side; however, the influence of the downstream-side water pressure is small because the pressure-receiving area of the end of the stem 28 is much smaller than the rear surface 26 of the top 23 of the valving element 22.

When a faucet at the downstream side is closed, the back pressure acting on the rear surface 26 of the valving element 22 increases, so that the valving element 22 that is constantly urged toward the valve seat portion 10 by the force of the spring 61 is seated on the valve seat portion 10. When the flow of water through narrow flow path portion 68 stops, the static pressure acting on the back-pressure chamber 50 becomes equal to the downstream-side water pressure again. It should be noted that when the valve opening of the valving element 22 is 100 percent, the rear surface 26 of the valving element 22 abuts against the downstream side surface 38a of the large-diameter portion 38 of the back-pressure chamber 50. In this case, however, the valving element 22 can return without any problem because, even in this state, the back-pressure chamber 50 is in communication with the narrow flow path portion 68 through the grooves 27 provided on the rear surface 26 of the valving element 22 as stated above. In addition, although the distal end of the stem 28 of the valving element 22 extends into the recess 55 of the spacer 51, the valving element 22 can move without any problem because the recess 55 is not closed but communicates with the downstream side through the bolt-fitting holes 56 as stated above.

The respective outer peripheries of the support member 35 and the spacer 51 smoothly change in diameter, and these two members are smoothly connected together at the joint therebetween. Further, the spacer 51 is in the shape of a substantially circular cone and has its downstream end 53 positioned at the center of the downstream-side flow path, i.e. in line with the center of the third uniform-diameter portion 14 of the casing 2. Therefore, the flow of water flowing around the support member 35 and the spacer 51 is very smooth. Thus, the occurrence of turbulent flow and separation of the flow of water are minimized, and preferably prevented. In this regard also, the pressure losses are minimized. Further, as will be clear from FIG. 3, the front surface 24 of the valving element 22 is configured so that, when the valving element 22 is fully open, the front surface 24 is substantially contiguous to the arcuate portion 46 of the support member 35 across the gap 66 along substantially the same circular arc. Accordingly, the flow of water is smooth. In this regard also, the pressure losses are minimized.

Figure 8:
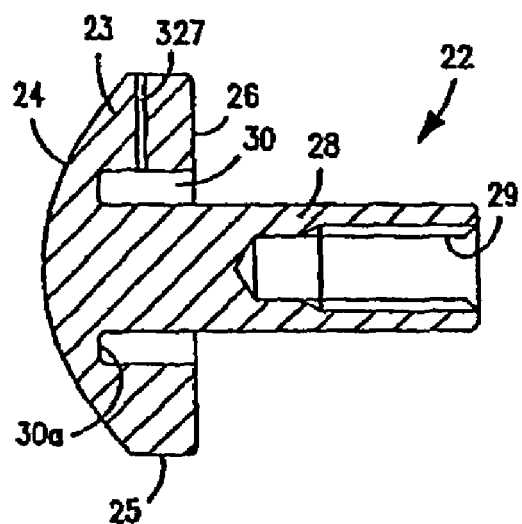
FIG. 8 is a longitudinal sectional view of a valving element of a second embodiment of the present invention.
Figure 9:
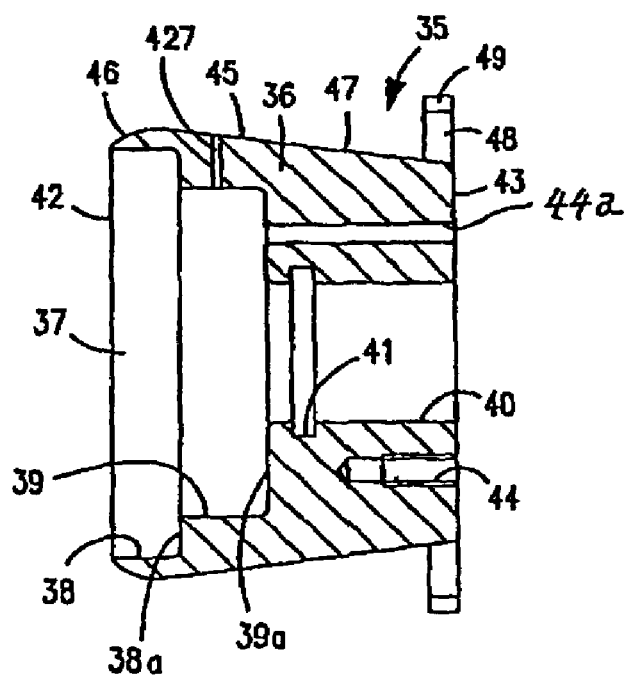
FIG. 9 is a longitudinal sectional view of a valving support member of a third embodiment of the present invention.

In the above-described embodiment, the communicating passage 67 that communicates between the narrow flow path portion 68 and the back-pressure chamber 50 comprises the gap 66 between the valving element 22 and the inner periphery of the large-diameter portion 38 of the support member 35 and the grooves 27 formed on the rear surface 26 of the valving element 22. The communicating passage, however, may be a hole 327 extending through the top 23 of the valving element 22 as shown in FIG. 8 or a hole 427 extending through the support member 35 as shown in FIG. 9.

Figure 6:
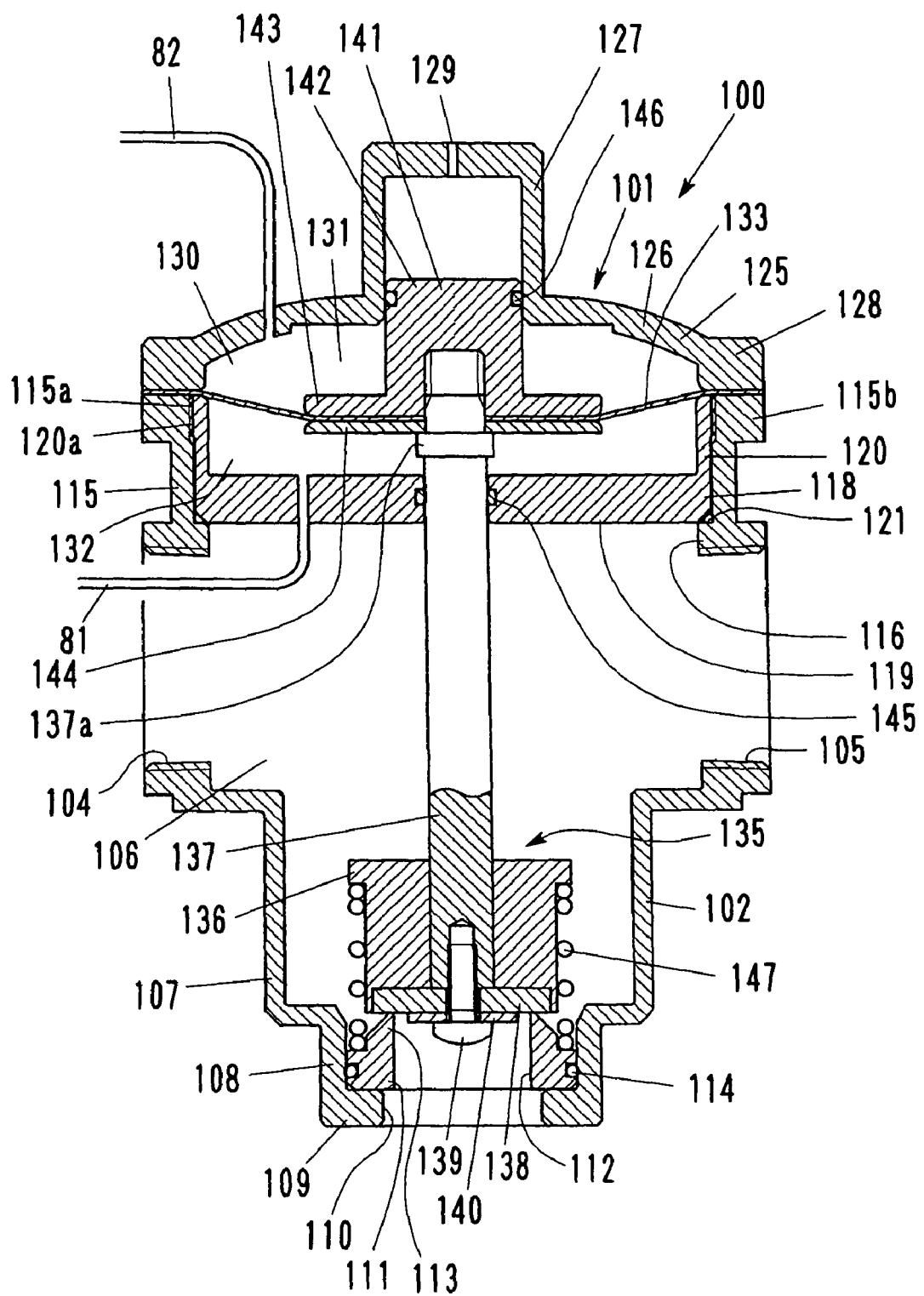
FIG. 6 is a longitudinal sectional view of an intermediate chamber used in the backflow preventer shown in FIG. 1.

Next, the intermediate chamber 100 will be explained with reference to FIG. 6. The intermediate chamber 100 largely differs in arrangement from the intermediate chamber of the conventional backflow preventer as follows. In the conventional intermediate chamber, the relief valve is controlled by using a pressure difference between the upstream and downstream sides of the first check valve, whereas the backflow preventer of this embodiment uses a pressure difference between the upstream pressure and the pressure in the above-described narrow flow path portion 68, which is the first portion of the intermediate flow path. This will be detailed below.

The illustrated intermediate chamber 100 has a casing 101 comprising a casing body 102 and a cap 125. The casing body 102 is provided with an internal flow path 106 having an inlet port 104 and an outlet port 105 that communicate with the first check valve 1 and the second check valve 200, respectively. As shown in FIG. 6, the lower part of the casing body 102 has a stepped structure comprising a large-diameter portion 107 and a small-diameter portion 108 that have circular cross-sectional configurations, respectively. The small-diameter portion 108 has a discharge port 110 provided in the center of the bottom 109 thereof. A valve seat member 111 is mounted on the inner side of the bottom 109 of the small-diameter portion 108. The valve seat member 111 has an opening 112 that is concentric with respect to the discharge port 110. A valve seat portion 113 is formed at the upper end of the valve seat member 111. Reference numeral 114 denotes an O-ring for sealing the valve seat member 111 to casing body 102.

An upper part of the casing body 102 is provided with a partition fitting portion 115 having a circular cross-sectional configuration and a predetermined height. A rigid partition member 118 is fitted to the partition fitting portion 115. The partition member 118 has a flat bottom portion 119 and a peripheral wall 120 extending upward from the outer periphery of the bottom portion 119. The peripheral wall 120 has an external thread 120a formed on the upper end thereof. The partition member 118 is secured to the casing body 102 by engaging the external thread 120a with an internal thread 115a formed on the upper end of the partition fitting portion 115. During assembly, the bottom 119 of the partition member 118 is placed on an inward flange 116 of narrow width extending between the internal flow path 106 and the partition fitting portion 115. The upper end of the peripheral wall 120 of the partition member 118 and the upper end of the partition fitting portion 115 are substantially flush with each other. Reference numeral 121 denotes an O-ring for sealing.

The illustrated cap 125 has a body portion 126 formed along an outwardly convex circular arc having a large radius of curvature. The cap 125 further has a short circular cylindrical portion 127 extending upward from the center of the body portion 126. The cap 125 is secured to the upper end 115b of the partition fitting portion 115 at the outer periphery 128 of the body portion 126 by proper securing device or members, e.g. bolts (not shown). A pressure chamber 130 is defined between the partition member 118 and the cap 125. The pressure chamber 130 is divided into an upper high-pressure chamber 131 and a lower low-pressure chamber 132 by a diaphragm 133 of elastic material that is secured at the outer periphery thereof by being clamped between the partition fitting portion 115 and the cap 125.

Reference numeral 136 denotes a valving element that constitutes a relief valve 135 in combination with the above-described valve seat member 111, diaphragm 133 and so forth. A lower end portion of a valve stem 137 is inserted into the valving element 136. A disk-shaped valve seat abutting member 138 of elastic material is secured in a recess formed on the lower surface of the valving element 136 by using a bolt 139 and a washer 140 that are attached to the lower end of the valve stem 137. The upper end portion of the valve stem 137 extends into the pressure chamber 130 through a hole in the bottom 119 of the partition member 118 and is secured at the upper end thereof to the diaphragm 133. More specifically, the upper end of the valve stem 137 is connected to a head member 141 by threaded engagement as shown in FIG. 6 The central portion of the diaphragm 133 is clamped between a flange 143 of the head member 141 and a retaining plate 144 mounted on a collar portion 137a of the valve stem 137. Thus, the valve stem 137 and the diaphragm 133 are integrated together. The head member 141 has a head portion 142 received in the cylindrical portion 127 of the cap 125, thereby being guided to move axially. The cap 125 has a vent 129 formed in the top of the cylindrical portion 127 thereof. Reference numerals 145 and 146 denote O-rings for sealing. A compression spring 147 is provided between the valving element 136 and the valve seat member 111 to serve as an urging member that constantly urges the valving element 136 upward, i.e. in the direction for opening the relief valve 135.

The above-described upstream and downstream communicating conduits 82 and 81 are connected to the high-pressure chamber 131 and the low-pressure chamber 132, respectively, as shown in the figure. Thus, the high-pressure chamber 131 is connected to the upstream side of the first check valve 1, and the low-pressure chamber 132 is connected to the narrow flow path portion 68, which is the first portion of the intermediate flow path.

In the intermediate chamber 100 arranged as stated above, the relief valve 135 is normally closed as follows. During the stoppage of water supply, the narrow flow path portion 68 of the first check valve 1 is in communication with the internal flow path 106 of the intermediate chamber 100 i.e. when water in the narrow flow path portion 68 is stationary. The low-pressure chamber 132 is acted upon by the water pressure in the narrow flow path portion 68 via conduit 81. The high-pressure chamber 131 is acted upon by the water pressure at the upstream side of the first check valve 1 via conduit 82. Normally, the relief valve 135 is closed against the spring 147 by the differential pressure between the above-described water pressures. In this regard, if the water pressure in the internal flow path 106, which corresponds to the conventional intermediate chamber, increases due, for example, to a seal failure of the check valve, as stated above, the pressure difference between the high-pressure chamber 131 and the low-pressure chamber 132 decreases. When the differential pressure falls below a set value and the force of the spring 147 exceeds the differential pressure, the relief valve 135 opens. The spring 147 of the relief valve 135 is designed in accordance with the set differential pressure. The spring 61 of the first check valve 1 is designed so that a pressure difference is generated between the upstream side of the first check valve 1 and the internal flow path 106, which can keep the relief valve 135 closed against the force of the spring 147 during the stoppage of water supply.

In the present invention, the pressure reduction at the downstream side of the first check valve during the water supply is less than in the conventional apparatus, as has been stated above. That is, the differential pressure between the upstream and downstream sides of the first check valve 1 is smaller than in a conventional apparatus. Therefore, it becomes impossible to obtain a sufficiently large differential pressure between the upstream and downstream sides if the intermediate chamber is arranged in the same way as in the conventional apparatus, that is, if it is arranged so that the water pressure at the downstream side of the first check valve 1, i.e. water pressure in the internal flow path 106, acts on the low-pressure side of the diaphragm 133 when water is flowing. If a sufficiently large differential pressure cannot be obtained, the relief valve 135 undesirably opens. In the present invention, however, the low-pressure chamber 132 is connected to the narrow flow path portion 68. The static pressure in the narrow flow path portion 68 decreases significantly during the water supply, i.e. when water is flowing normally. Accordingly, the differential pressure between the upstream and downstream sides becomes sufficiently large to keep the relief valve 135 closed. Thus, the backflow preventer according to the present invention can greatly reduce the pressure losses and still close the relief valve during the water supply.

Figure 7:
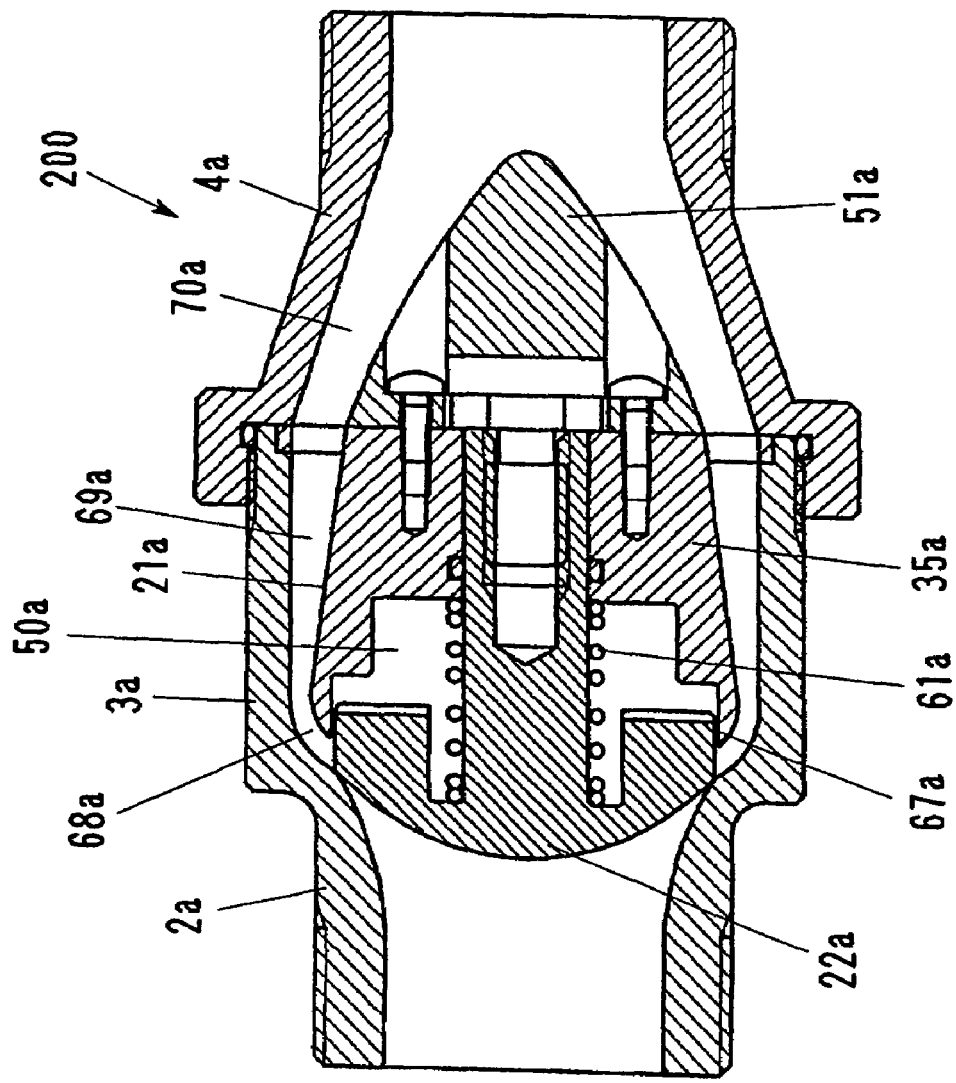
FIG. 7 is a longitudinal sectional view of a second check valve used in the backflow preventer shown in FIG. 1.

Next, the second check valve 200 installed at the downstream side of the intermediate chamber 100 will be explained with reference to FIG. 7. In this embodiment, the second check valve 200 has the same basic arrangement and operates in the same way as the first check valve 1. Therefore, the main constituent members of the second check valve 200 are denoted by the same reference numerals as used in the description of the first check valve 1 with the letter "a" suffixed thereto, and a detailed description thereof is omitted herein.

The second check valve 200 has a casing 2a comprising a casing body 3a and a retaining member 4a. The second check valve 200 includes a valving element assembly 21a, a valving element 22a, a valving element support member 35a, a spacer 51a, a back-pressure chamber 50a, a spring 61a, and a communicating passage 67a. A narrow flow path portion 68a, which is a first portion of an intermediate flow path, communicates with the back-pressure chamber 50a through the communicating passage 67a. A diffuser flow path portion 69a and a uniform flow path portion 70a are provided in the same way as in the first check valve 1. It should be noted that the spring 61a is weaker in force than the spring 61 of the first check valve 1. The reason for this is that the second check valve 200 need not generate a differential pressure as great as that needed in the first check valve 1 but is still required to provide a backflow preventing function. Therefore, a weaker spring is used as the spring 61a to allow the valve opening to increase even with the application of a relatively small force during the water supply. Further, in this embodiment, when water is flowing through valve 200, a small static pressure generated in the narrow flow path portion 68a acts on the back-pressure chamber 50a in the same way as in the first check valve 1. Therefore, the valve opening reaches 100 percent even at a low flow rate. Accordingly, there is very little, preferably substantially no, pressure loss in the second check valve 200. As will be clear from FIG. 7, the second check valve 200 is not provided with communicating passages corresponding to the downstream and upstream communicating conduits 81 and 82, which are provided in association with the first check valve 1. Further, the valving element support member 35a and the spacer 51a are not provided with through-holes corresponding to the through-holes 44a and 57 provided in the first check valve 1. Although this embodiment uses the second check valve 200 having the above-described structure, a check valve of the type that is used as the second check valve in the conventional apparatus may be used in place of the second check valve 200 because the second check valve of the conventional apparatus also need not generate a differential pressure and hence uses a relatively weak spring.

What is claimed is:

1. A pressure-reducing backflow preventer comprising:
a first check valve;
a second check valve;
an intermediate chamber provided between said first check valve and said second check valve;
a relief valve provided in said intermediate chamber;
said first check valve comprising:
  a first casing having a first flow path formed therein and a first valve seat formed at an intermediate portion of said first flow path;
  a first valving element disposed in said first flow path, said first valving element movably positioned, at least partially in said first flow path, to selectively seat on and unseat from said first valve seat at one end thereof;
  a first urging member that urges said first valving element toward said first valve seat;
  a back-pressure chamber that movably receives at one end thereof at least a portion of said first valving element;
  a narrow flow path portion downstream of a position at which said first valving element abuts against said first valve seat, an upstream end of said narrow flow path portion being brought into and out of communication with an upstream side of said first flow path in response to said first valving element unseating from and seating on said first valve seat, a downstream end of said narrow flow path portion being constantly in communication with a downstream side of said first flow path; and
  a communicating passage providing fluidic communication between said narrow flow path portion and said back-pressure chamber
said relief valve comprising:
  a discharge port formed in a casing of said intermediate chamber, said discharge port having a relief valve seat;
  a relief valving element movable to selectively seat on and unseat from said relief valve seat;
  a relief valve urging member that urges said relief valving element away from said relief valve seat; and
  a differential pressure applying mechanism that applies a differential pressure, determined by a pressure differential between a fluid pressure at an upstream side of said first check valve and a fluid pressure in said narrow flow path portion, to said relief valving element in a direction against said relief valve urging member,
wherein said differential pressure applying mechanism comprises:
  a pressure chamber comprising a high-pressure chamber and a low-pressure chamber separated by a pressure-receiving movable member; and
  a coupling member that connects said pressure-receiving movable member and said relief valving element which move in interlocking relation to each other,
wherein said pressure chamber is part of said intermediate chamber, and;
said pressure-reducing backflow preventer further comprising:
  a high-pressure side communicating conduit providing fluidic communication between said high-pressure chamber and the upstream side of said first check valve; and
  a low-pressure side communicating conduit providing fluidic communication between said low-pressure chamber and said narrow flow path portion.

2. A pressure-reducing backflow preventer according to claim 1, wherein said low-pressure chamber communicates with said narrow flow path portion through said back-pressure chamber.

3. A pressure-reducing backflow preventer according to claim 1, wherein said first check valve further comprises:
a diffuser flow path portion that is contiguous with a downstream side end of said narrow flow path portion, said diffuser flow path portion gradually increasing in flow path area toward a downstream side thereof.

4. A pressure-reducing backflow preventer according to claim 3, wherein said first check valve further comprises:
a uniform flow path portion that is contiguous with a downstream side end of said diffuser flow path portion, said uniform flow path portion comprising a uniform flow path area.

5. A pressure-reducing backflow preventer according to claim 2, wherein said second check valve comprises:
a second casing having a second flow path formed therein and a second valve seat formed at an intermediate portion flow path;
a second valving element disposed in said second flow path, said second valving element being movably positioned, at least partially in said second flow path, to selectively seat on and unseat from said second valve seat at one end thereof;
a second urging member that urges said second valving element toward said second valve seat;
a second back-pressure chamber that movably receives at one end thereof at least a portion of said second valving element;
a narrow flow path portion downstream of a position at which said second valving element abuts against said second valve seat, one end of said narrow flow path portion being brought into and out of communication with an upstream side of said second flow path in response to said second valving element unseating from and seating on said second valve seat, the other end of said narrow flow path portion being constantly in communication with a downstream side of said second flow path; and a communicating passage that communicates between said narrow flow path portion and said second back-pressure chamber.

6. A pressure-reducing backflow preventer according to claim 1, wherein said second check valve comprises:

a second casing having a second flow path formed therein and a second valve seat formed at an intermediate portion of said flow path;

a second valving element disposed in said second flow path, said second valving element being movably positioned, at least partially in said second flow path, to selectively seat on and unseat from said second valve seat at one end thereof;

a second urging member that urges said second valving element toward said second valve seat;

a second back-pressure chamber that movably receives at one end thereof at least a portion of said second valving element;

a narrow flow path portion downstream of a position at which said second valving element abuts against said second valve seat, one end of said narrow flow path portion being brought into and out of communication with an upstream side of said second flow path in response to said second valving element unseating from and seating on said second valve seat, the other end of said narrow flow path portion being constantly in communication with a downstream side of said second flow path; and a communication passage that communicates between said narrow flow path portion and said second back-pressure chamber.

7. A pressure-reducing backflow preventer comprising:

a primary flow path;

a secondary flow path;

an intermediate chamber provided between said primary flow path and said secondary flow path;

a first check valve provided between said primary flow path and said intermediate chamber;

a second check valve provided between said intermediate chamber and said secondary flow path;

a relief valve provided in said intermediate chamber;

said first check valve comprising:

a first casing having a first flow path formed therein and a first valve seat formed at an intermediate portion of said first flow path;

a first valving element disposed at the downstream side of the first valve seat in said first flow path, said first valving element movably positioned in said first flow path to selectively seat on and unseat from said first valve seat;

a first urging member that urges said first valving element toward said first valve seat;

said first check valve further comprising;

a substantially circular cylindrical first valving element support fixedly disposed centrally in said first flow path downstream of the first valve seat, said first valving element support movably supporting said first valving element, and a first intermediate flow path which is annular in section formed between an outer periphery of said first valving element support and an inner periphery of said first casing, wherein said first valving element comprises:

a head portion having a top portion for seating on and unseating from said first valve seat and a column portion extending in the downstream direction, wherein said first valving element support comprises;

a recess movably receiving said column portion of the first valving element;

wherein said first intermediate flow path comprises a first narrow flow path portion extending from a position corresponding to a mouth of said recess toward the downstream side, said first narrow flow path portion being narrower than the rest of said first intermediate flow path in the flow path area, said first check valve further comprising;

a first communicating passage formed between an inner periphery of said recess and an outer periphery of said column portion of the first valving element for connecting said first narrow flow path portion of said intermediate flow path to the inside of the recess on the rear side of said head of the first valving element;

and said relief valve comprising:

a discharge port formed in a casing of said intermediate chamber, said discharge port having a relief valve seat;

a relief valving element movable to selectively seat on and unseat from said relief valve seat;

a relief valve urging member that urges said relief valving element away from said relief valve seat; and a differential pressure applying mechanism that applies a differential pressure, determined by a pressure differential between a fluid pressure at an upstream side of said first check valve and a fluid pressure in said first portion of the intermediate flow path, to said relief valving element in a direction against said relief valve urging member.

8. A pressure-reducing backflow preventer according to claim 7, wherein said recess formed in the first valving element support of the first check valve comprises;

a first recess portion on the mouth side of the recess having a larger diameter, and a second recess portion adjacent to said first recess portion and having a diameter shorter than the diameter of the first recess portion, wherein, when said first valving element is fully moved and fully opened, the rear surface of said column portion of the first valving element abuts against a bottom surface of the first recess portion so that the further movement of the first valving element in the downstream direction is prevented, and wherein said rear surface of the column portion of the first valving element and said bottom surface of the first recess portion are arranged such that, when the first valving element is fully opened, a first auxiliary communicating passage extending in the radial direction of said first valving element is defined between said rear surface of the column portion and said bottom surface of the first recess portion to connect an inner end of said first communicating passage with the inside of said second recess portion.

9. A pressure-reducing backflow preventer according to claim 8, wherein said differential pressure applying mechanism comprises:

a pressure chamber comprising a high-pressure chamber and a low-pressure chamber separated by a pressure-receiving movable member; and a coupling member that connects said pressure-receiving movable member and said relief valving element which move in interlocking relation to each other.

10. A pressure-reducing backflow preventer according to claim 9, wherein said pressure chamber is defined by partitioning said intermediate chamber by a rigid partition.

11. A pressure-reducing backflow preventer according to claim 10, said pressure-reducing backflow preventer further comprising:

a high-pressure side communicating conduit providing fluidic communication between said high-pressure chamber and the upstream side of said first check valve; and a low-pressure side communicating conduit providing fluidic communication between said low-pressure chamber and said first narrow flow path portion of the intermediate flow path.

12. A pressure-reducing backflow preventer according to claim 11, wherein said low-pressure chamber communicates with said first narrow flow path portion of the intermediate flow path through said recess.

13. A pressure-reducing backflow preventer according to claim 7, wherein said first intermediate flow path of the first check valve further comprises:

a diffuser flow path portion that is contiguous with a downstream end of said first narrow flow path portion, said diffuser flow path portion gradually increasing in flow path area toward a downstream side thereof.

14. A pressure-reducing backflow preventer according to 13, wherein said first intermediate flow path of the first check valve further comprises:

a uniform flow path portion that is contiguous with a downstream end of said diffuser flow path portion, said uniform flow path portion comprising a uniform flow path area.

15. A pressure-reducing backflow preventer according to claim 7, said second check valve comprising:

a second casing having a second flow path formed therein and a second valve seat formed at an intermediate portion of said second flow path;

a second valving element disposed at the downstream side of the second valve seat in said second flow path, said second valving element movably positioned in said second flow path to selectively seat on and unseat from said second valve seat;

a second urging member that urges said second valving element toward said second valve seat;

said second check valve further comprising;

a substantially circular cylindrical second valving element support fixedly disposed centrally in said second flow path downstream of the second valve seat, said second valving element support movably supporting said second valving element, and a second intermediate flow path which is annular in section and defined by an outer periphery of said second valving element support and an inner periphery of said second casing, wherein said second valving element comprises:

a head portion having a top portion for seating on and unseating from said second valve seat and a column portion extending in the axial direction of said second valving element, wherein said second valving element support comprises;

a recess movably receiving said column portion of the second valving element;

wherein said second intermediate flow path comprises a second narrow flow path portion extending from a position corresponding to a mouth of said recess toward the downstream side, said second narrow flow path portion being narrower than the rest of said second intermediate flow path in the flow path area, said second check valve further comprising;

a second communicating passage formed between an inner periphery of said recess and an outer periphery of said column portion of the second valving element for connecting said second narrow flow path portion of the said second intermediate flow path to the inside of the recess on the rear side of said head of the second valving element.

16. A pressure-reducing backflow preventer according to claim 7, wherein said differential pressure applying mechanism comprises:

a pressure chamber comprising a high-pressure chamber and a low-pressure chamber separated by a pressure-receiving movable member; and a coupling member that connects said pressure-receiving movable member and said relief valving element which move in interlocking relation to each other.

17. A pressure-reducing backflow preventer according to claim 16, wherein said pressure chamber is defined by partitioning said intermediate chamber by a rigid partition.

18. A pressure-reducing backflow preventer according to claim 17, said pressure-reducing backflow preventer further comprising:

a high-pressure side communicating conduit providing fluidic communication between said high-pressure chamber and the upstream side of said first check valve; and a low-pressure side communicating conduit providing fluidic communication between said low-pressure chamber and said first narrow flow path portion of the first intermediate flow path.

19. A pressure-reducing backflow preventer according to claim 18, wherein said low-pressure chamber communicates with said first narrow flow path portion of the first intermediate flow path through said recess.

* * * * *